United States Patent [19]
Curtin

[11] 3,892,126
[45] July 1, 1975

[54] METHOD AND APPARATUS FOR FACILITATING TESTING THE LIQUID ABSORPTIVITY OF SOIL

[76] Inventor: John J. Curtin, Main St., South Britain, Conn. 06487

[22] Filed: Mar. 14, 1974

[21] Appl. No.: 451,051

[52] U.S. Cl. ................................ 73/38; 73/322
[51] Int. Cl.² ........................................ G01F 23/08
[58] Field of Search ....... 73/38, 155, 305, 306, 307, 73/308, 310, 312, 313, 319, 322, 320, 321

[56] References Cited
UNITED STATES PATENTS
1,143,344  6/1915  Yarnall .......................... 73/322 X FOREIGN PATENTS OR APPLICATIONS
146,267  8/1962  U.S.S.R. ............................. 73/305
25,029  8/1970  Japan ................................ 73/155

Primary Examiner—Jerry W. Myracle

[57] ABSTRACT

Means are provided for measuring substantially at eye level the extent of fall or rise, within a measured period of time, of the liquid level within a test hole of predetermined size filled with a predetermined amount of liquid, in soil the absorptivity of which is being tested. A measuring stick extends up from a support member adapted to be disposed in a horizontal plane over the test hole, and a suitably guided rod, with marker means coactive with the measuring stick, extends through the support member in parallel relation to the measuring stick and is supported by a float member disposed in the liquid in the test hole and movable down or up in response to change in the level of the liquid within the test hole.

3 Claims, 4 Drawing Figures

METHOD AND APPARATUS FOR FACILITATING TESTING THE LIQUID ABSORPTIVITY OF SOIL

FIELD OF THE INVENTION AND METHOD

This invention relates to apparatus for facilitating testing the liquid absorption quality of soil.

From the point of view of public health, the need for making accurate tests of the liquid absorptivity of soil increases with the increasing density of population. For building of homes and new housing and business developments, it is essential to ascertain the drainage quality of the soil at the site or sites under consideration. For reforestation or the planting of individual trees it should be determined in advance whether the roots will be well drained or slowly drowned by standing water in the soil.

While the need for making accurate tests of the liquid absorptivity of soil has long been recognized, no satisfactory apparatus for making or facilitating the making of such tests has been commercially available. Rough tests have been made by digging a hole in the soil, filling it with a predetermined volume of water, sticking a measuring stick such as a yard stick into the hole, and timing by the use of a watch or other time keeping instrument how long it takes for the water level to drop a distance measured along the yardstick. While holding a yardstick in one hand and timing the fall of the liquid level using a time piece held in the other hand, it is difficult to mark accurately the liquid level at the beginning and at the end of the test. And this difficulty is increased where the hole is deep and the liquid level is well below the ground surface, and particularly where the surface is sloping or uneven.

SUMMARY OF THE INVENTION

A support member like a table top is mounted on a tripod adapted in use to position the support member over a test hole in soil the absorptivity of which is to be measured. Means are provided for controlling the level of the support member to compensate for unevenness or sloping of the land surface at the location of the test hole. A calibrated measuring stick or ruler is supported by the support member at a right angle to the support member, and extending through an aperture in the support member and through suitable guide means, which may project from the measuring stick, is a rod having at its lower end a float adapted to support the rod when the float is disposed in water in the said hole in the soil. A marker member on the rod, disposed to indicate a height on the measuring stick corresponding with the water level within the hole at the start of a timed test moves with the rod to indicate a height on the measuring stick corresponding with the water level at the end of the test period, and the difference between the two readings indicate the change in the water level during the test period.

In the apparatus disclosed herein the calibrated measuring stick or ruler is not disposed in the liquid filled hole but remains at all times approximately in line with the tester's eyes while the change in the liquid level is indicated by the movements of a float supported rod which may be long enough so that its lower end extends to the liquid in the hole while its upper end, or a marker on its upper portion, moves down, or up, if liquid is flowing into the hole from the surrounding soil, along the ruler where its extent of movement can be readily and accurately read. While making a test, the tester's attention is not diverted by having to hold a ruler upright in the liquid containing hole because the ruler is supported by the table top of the apparatus and can be held in upright position regardless of the slope or unevenness of the soil surface by adjustment of the level of the table top, either by tilting of the table top, or adjustment of the length of one or more of the legs on which the table top is supported, or both. The likelihood of human error is thus greatly reduced.

The invention will be best understood by reading the following description in connection with the drawings in which, FIG. 1 is a top plan view, FIG. 2 is an elevational view, FIG. 3 is a sectional view taken on the line 3—3 of FIG. 2, and FIG. 4 is a view similar to FIG. 2, but showing the assembled device disposed over a water filled hole in an operating position.

DESCRIPTION OF THE ILLUSTRATED EMBODIMENT OF THE INVENTION

Figure 1:
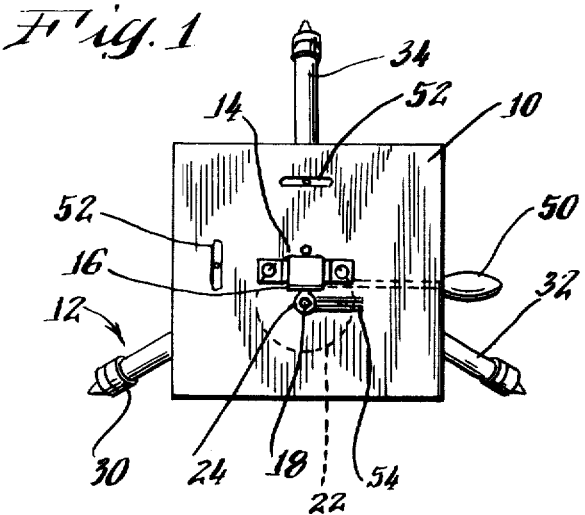
Figure 2:
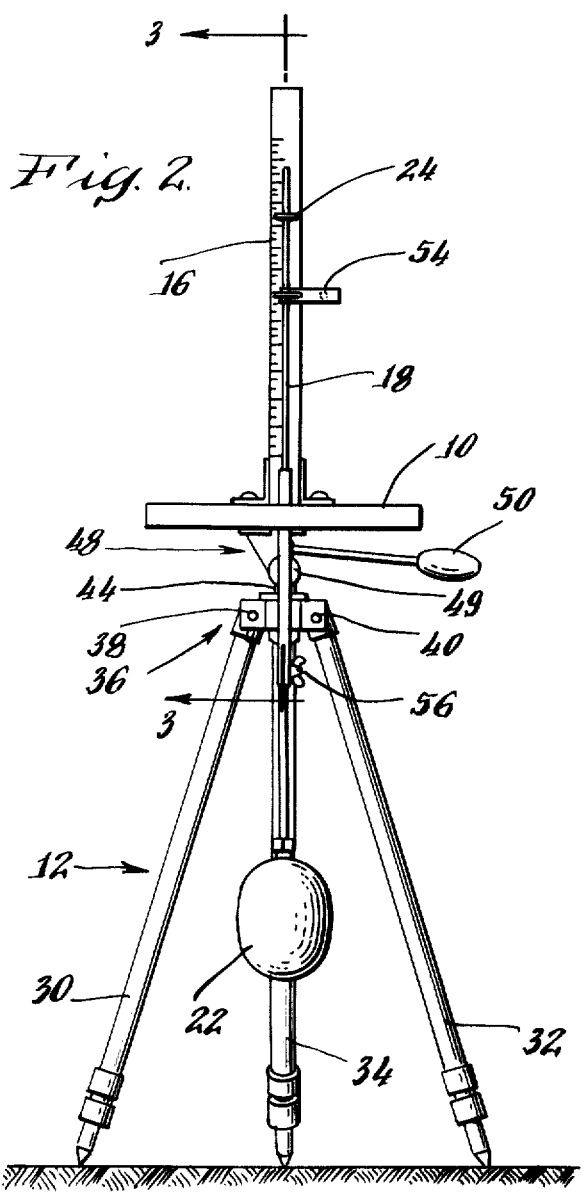
Figure 4:
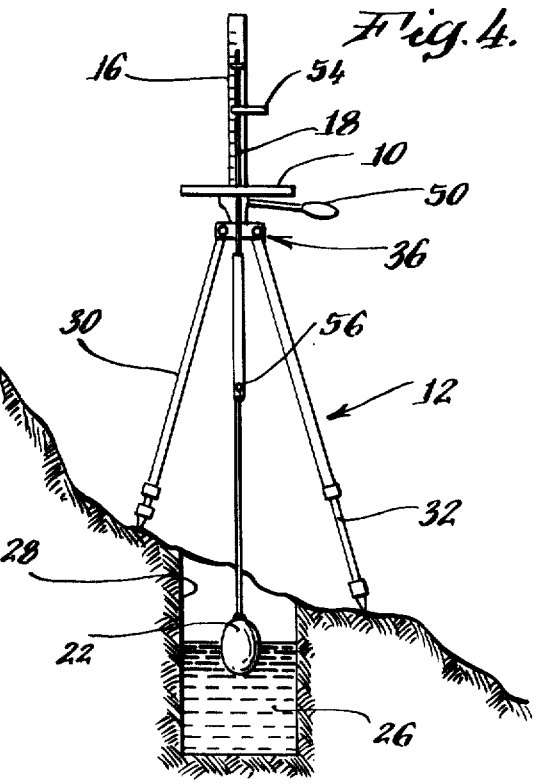
Figure 3:
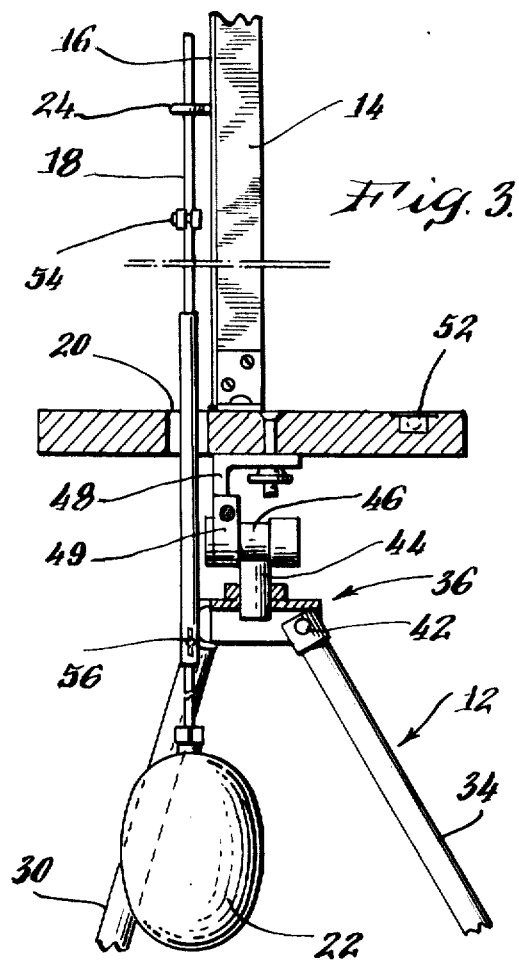

A table top 10 is supported on a tripod 12 by means which permit the level of the table top to be controlled so that in use the table top will be substantially horizontal. Extending upwardly from the table top 10, at a right angle to the table top is a support member 14 which itself supports a ruler in parallel relation to it, or, is itself calibrated on one face to serve as a ruler 16. Disposed in parallel relation to the ruler and preferably close to the calibrated face of the ruler is a rod 18 which is mounted for movement up and down in a plane parallel to the plane of the ruler, and the table top is bored or otherwise provided with an aperture 20 through which the rod 18 extends. A float 22 is provided at the lower end of rod 18. Guide means 24, shown herein as eye-bolts project outwardly for the support member 14, to retain the rod 18 in parallel relation to the ruler, as it is moved down, or in some cases up, by the lowering or rising of the float 22, in water 26 within a hole 28 in soil, the absorption rate of which is being measured.

The legs 30, 32 and 34 of the tripod 12 are pivotally mounted at their upper ends to a head member 36, by pivots 38, 40, and 42 respectively, angularly disposed around the head for swinging the legs toward and away from the head, from an inactive position in which the legs are swung inwardly into substantially parallel planes, to an operative position with the legs swung outwardly to straddle the hole 28 containing the water by which the float 22, and therefore also the rod 18, is supported.

Extending up from the top of head member 36 is a stud 44 which supports a cross member 46, which serves as a bearing and extending down from the under surface of the table top is an arm 48 which defines a circular member 49 which fits on member 46 and serves as a journal which is rotatable on bearing 46, Projecting from arm 48 and journal 49 is a control handle 50 by which the journal 49, arm 48 and table top 10 may be rotated to adjust the level of the table top 10, to keep the ruler 16 and the rod 18 substantially vertical when in use and compensate for unevenness and sloping of the surface on which the tripod is disposed.

To further control the disposition of the top 10, and the ruler 16 and the rod 18, the legs of the tripod may be made adjustable in length in any suitable way.

As an aid in checking whether the table top is level, conventional level members 52 of known kind may be provided on the table top, and disposed normal to one another.

When the apparatus is not in use, means, such as a clip member 54 may be clipped on the rod just above a guide member 24 to hold the rod in stationary position. If desired the float 22 may be detachable from the lower end of rod 18, as for example by a threaded inter connection or by a pin and slot connection 56, or both, as illustrated.

When the apparatus is in use the clip member 54 is clipped to the rod 18 below a guide member 24 so that it will travel with the rod as the float 22 drops or rises depending upon whether the initially measured volume of water is absorbed by the soil surrounding the hole 28 of predetermined size, or whether water flows into the hole from the surrounding soil. By noting the distance, the clip moves along the ruler within a given period of time an accurate measure of the absorption capability of the soil surrounding hole 28 is provided.

What I claim is:

1. Apparatus for facilitating the testing of the water absorption of soil at a particular site which comprises,
    a table top having an aperture extending through it at a right angle to the plane of the top,
    means for supporting the top above a hole of predetermined size formed in the soil at the test site and initially filled with a predetermined volume of water,
    a ruler extending up from the top at a right angle to the top and substantially at the level of the eyes of a person performing the test,
    a rod extending through the aperture in the top and freely movable down or up through the aperture,
    a float disposed at the lower end of the rod adapted when disposed in the body of water in said test hole below the top to support the rod at a level determined by the level of the water in said hole,
    guide means for holding the said rod close to the said ruler and in substantially parallel relation thereto so that the rod moves along the face of the ruler as it falls or rises in response to the lowering or rising of the level of the water in the said test hole,
    and marker means disposed on the rod above the top for coacting with the said rule for indicating the extent of movement of the rod.

2. The apparatus in claim 1 including means for controlling the angle of the top to compensate for sloping or unevenness of the soil surface and maintain the ruler and the rod normal to the surface of the water in the said hole.

3. The method of testing the liquid absorption quality of soil which comprises,
    forming a hole of predetermined size in the soil at the test site and initially placing therein a predetermined volume of liquid,
    providing a table top having an aperture extending through it and positioning the said top above the said hole,
    providing a ruler extending up from the top substantially at a right angle to the top, and substantially at the level of the eyes of the person performing the test,
    inserting a rod extending through the aperture in the top and providing guide means so that the rod can move up and down through the aperture in the top while remaining close to the ruler and in substantially parallel relation thereto,
    disposing at the lower end of the rod below the top a float adapted when placed in the body of liquid in the hole to support the rod at a level determined by the level of the liquid in said hole,
    and providing the rod with marker means above the top coacting with the ruler means above the top for indicating the extent of movement of the rod and thus providing a measurement of the change in the liquid level within the hole within a measured period of time.

* * * * *